US009904339B2

United States Patent
Shapira et al.

(10) Patent No.: US 9,904,339 B2
(45) Date of Patent: *Feb. 27, 2018

(54) PROVIDING LIFETIME STATISTICAL INFORMATION FOR A PROCESSOR

(71) Applicant: Intel Corporation, Santa Clara, CA (US)

(72) Inventors: Dorit Shapira, Atlit (IL); Efraim Rotem, Haifa (IL); Doron Rajwan, Rishon Le-Zion (IL); Nadav Shulman, Tel Mond (IL); Esfir Natanzon, Haifa (IL); Nir Rosenzweig, Givat Ella (IL)

(73) Assignee: Intel Corporation, Santa Clara, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 14/482,148

(22) Filed: Sep. 10, 2014

(65) Prior Publication Data

US 2016/0070321 A1    Mar. 10, 2016

(51) Int. Cl.
*G06F 1/26* (2006.01)
*G06F 1/32* (2006.01)

(52) U.S. Cl.
CPC ............ *G06F 1/26* (2013.01); *G06F 1/3206* (2013.01); *G06F 1/3296* (2013.01)

(58) Field of Classification Search
CPC ......... G06F 1/26; G06F 1/3206; G06F 1/3296
See application file for complete search history.

(56) References Cited

U.S. PATENT DOCUMENTS

| 3,246,242 A | 4/1966 | O'Hagan et al. |
| 5,844,917 A | 12/1998 | Salem et al. |
| 5,867,809 A | 2/1999 | Soga et al. |

(Continued)

FOREIGN PATENT DOCUMENTS

| DE | 102 38 174 | 3/2004 |
| DE | 10 2004 012 05 | 2/2005 |

(Continued)

OTHER PUBLICATIONS

U.S. Patent and Trademark Office, Office Action dated Sep. 25, 2014, with Reply filed Dec. 15, 2014, in U.S. Appl. No. 13/221,152.

(Continued)

*Primary Examiner* — Vincent Tran
*Assistant Examiner* — Chad Erdman
(74) *Attorney, Agent, or Firm* — Trop, Pruner & Hu, P.C.

(57) ABSTRACT

In one embodiment, a processor includes multiple cores and a power control unit (PCU) coupled to the cores. The PCU has a stress detector to receive a voltage and a temperature at which the processor is operating and calculate lifetime statistical information including effective reliability stress, maintain the lifetime statistical information over multiple boot cycles of a computing system such as personal computer, server computer, tablet computer, smart phone or any other computing platform, control one or more operating parameters of the processor based on the lifetime statistical information, and communicate at least a portion of the lifetime statistical information to a user and/or a management entity via an interface of the processor. Other embodiments are described and claimed.

17 Claims, 19 Drawing Sheets

(56) References Cited

U.S. PATENT DOCUMENTS

| | | | |
|---|---|---|---|
| 6,134,675 A | 10/2000 | Raina | |
| 6,424,930 B1* | 7/2002 | Wood | G01R 31/2642 340/505 |
| 6,908,227 B2 | 6/2005 | Rusu et al. | |
| 7,146,292 B2 | 12/2006 | Rossi et al. | |
| 7,183,799 B1 | 2/2007 | Donlin et al. | |
| 7,313,706 B2 | 12/2007 | Williams et al. | |
| 7,412,353 B2 | 8/2008 | Borkar | |
| 7,472,038 B2 | 12/2008 | Bose et al. | |
| 7,482,269 B2 | 1/2009 | Borkar | |
| 7,493,477 B2 | 2/2009 | Velhal et al. | |
| 7,495,519 B2 | 2/2009 | Kim et al. | |
| 7,574,613 B2 | 8/2009 | Holle et al. | |
| 7,616,021 B2 | 11/2009 | Papageorgiou et al. | |
| 7,774,590 B2 | 8/2010 | Borkar | |
| 7,774,625 B1 | 8/2010 | Sheng et al. | |
| 7,779,287 B2 | 8/2010 | Lim et al. | |
| 7,849,332 B1 | 12/2010 | Alben et al. | |
| 7,917,328 B2 | 3/2011 | Casey et al. | |
| 8,064,197 B2 | 11/2011 | Mowry et al. | |
| 8,151,094 B2 | 4/2012 | Vera | |
| 8,589,140 B1* | 11/2013 | Poulin | G06F 11/3457 463/42 |
| 2001/0021217 A1 | 9/2001 | Gunther et al. | |
| 2003/0005380 A1 | 1/2003 | Nguyen et al. | |
| 2003/0055602 A1* | 3/2003 | Sato | G06F 11/3409 702/182 |
| 2003/0078741 A1 | 4/2003 | Storino | |
| 2003/0110012 A1 | 6/2003 | Orenstien et al. | |
| 2004/0123201 A1 | 6/2004 | Nguyen et al. | |
| 2005/0125181 A1 | 6/2005 | Robert et al. | |
| 2005/0144524 A1 | 6/2005 | Bonaccio et al. | |
| 2005/0237319 A1 | 10/2005 | Ranganathan et al. | |
| 2005/0240850 A1 | 10/2005 | Ohwada et al. | |
| 2006/0015674 A1 | 1/2006 | Murotake | |
| 2006/0015862 A1 | 1/2006 | Odom et al. | |
| 2006/0114024 A1 | 6/2006 | Feng et al. | |
| 2006/0171244 A1 | 8/2006 | Ando | |
| 2006/0212269 A1 | 9/2006 | Lee et al. | |
| 2007/0033425 A1 | 2/2007 | Clark | |
| 2008/0126748 A1 | 5/2008 | Capps et al. | |
| 2009/0287909 A1* | 11/2009 | Vera | G06F 11/008 712/220 |
| 2010/0214007 A1 | 8/2010 | Konstadinidis et al. | |
| 2010/0268931 A1 | 10/2010 | Borkar | |
| 2013/0054179 A1* | 2/2013 | Shapira | G06F 11/3058 702/117 |
| 2013/0082662 A1* | 4/2013 | Carre | H02J 7/0052 320/134 |
| 2014/0244212 A1* | 8/2014 | Allen-Ware | G01R 31/2851 702/182 |
| 2014/0372681 A1* | 12/2014 | Cha | G06F 3/0616 711/103 |
| 2015/0058653 A1* | 2/2015 | Blayvas | G06F 1/26 713/340 |
| 2015/0074469 A1* | 3/2015 | Cher | G06F 11/008 714/47.2 |
| 2015/0169382 A1* | 6/2015 | Anderson | G06F 9/5094 718/104 |
| 2015/0249512 A1* | 9/2015 | Adimatyam | H04H 20/12 725/107 |
| 2015/0346271 A1* | 12/2015 | Uppal | G01R 31/2642 324/762.01 |
| 2016/0091893 A1* | 3/2016 | Bancallari | G05B 15/02 700/79 |

FOREIGN PATENT DOCUMENTS

| | | |
|---|---|---|
| DE | 103 57 284 | 7/2005 |
| WO | WO 2000/65363 | 11/2000 |
| WO | WO 2004/012131 | 2/2004 |
| WO | WO 2005/029329 | 3/2005 |
| WO | WO 2006/004875 | 1/2006 |

OTHER PUBLICATIONS

U.S. Patent and Trademark Office, Final Office Action dated Jan. 15, 2015, with Reply filed Mar. 12, 2015, in U.S. Appl. No. 13/221,152.

* cited by examiner

PROVIDING LIFETIME STATISTICAL INFORMATION FOR A PROCESSOR

BACKGROUND

In modern processors and other semiconductor devices, it is known that as the product ages, certain degradations become manifest. Several different phenomena can cause degradation to a semiconductor device, for example, hot-carrier injection, bias temperature instability, oxide breakdown (also known as time dependent dielectric breakdown (TDDB)), electro-migration and more. Each of these degradation mechanisms occurs due to various factors like temperature, voltage, current and others, where temperature and voltage impact the degradation exponentially.

Accordingly, the probability of failure of a semiconductor device is a function of various run time parameters, its actual time and use and other utilization measures. It is difficult for consumers of such semiconductor devices, whether in the form of processors or other integrated circuits, to determine a product's probability of failure and take appropriate action, given that such information is generally not available whatsoever, and typically is in no way available to interested parties, such as end users, original equipment manufacturers (OEMs), information technology (IT) personnel and so forth.

DETAILED DESCRIPTION

In various embodiments, an effective stress on a processor or other semiconductor device can be determined and used to control frequency/voltage or other settings at which the device operates. In this way, when there is low stress, e.g., when a product is relatively new, the product can operate at higher frequencies and/or lower voltages. As a result, it may be possible for a processor to gain multiple frequency bins, e.g., 1 or 2 turbo frequency bins at a beginning of its lifetime. Furthermore, since power is a square function of voltage, embodiments may enable running a processor at lower power to realize the same performance.

In addition, embodiments provide an interface and mechanism to enable effective stress information to be communicated from the processor or other semiconductor device to interested parties. In different situations, these interested parties may include end users of the devices such as a consumer, IT personnel of a given entity (such as a corporation) that manages computer resources for the entity. Or the IT personnel may be of a datacenter or cloud service provider that manages hardware resources of the datacenter/cloud service provider. Still further, information obtained from the processor or other semiconductor device including lifetime stress information may be communicated to a vendor such as the processor manufacturer for purposes of debugging, design and so forth.

Although embodiments described herein are with regard to processors such as multicore processors including multiple cores, system agent circuitry, cache memories, and one or more other processing units, understand the scope of the present invention is not limited in this regard and embodiments are applicable to other semiconductor devices such as chipsets, graphics chips, memories and so forth. Also, although embodiments described herein are with regard to control of voltage/frequency settings, stress monitoring and communication in accordance with an embodiment of the present invention can be used to control other device settings like maximum temperature, currents, and so forth, as well as to effect platform level control, and even affect future designs.

Figure 1:
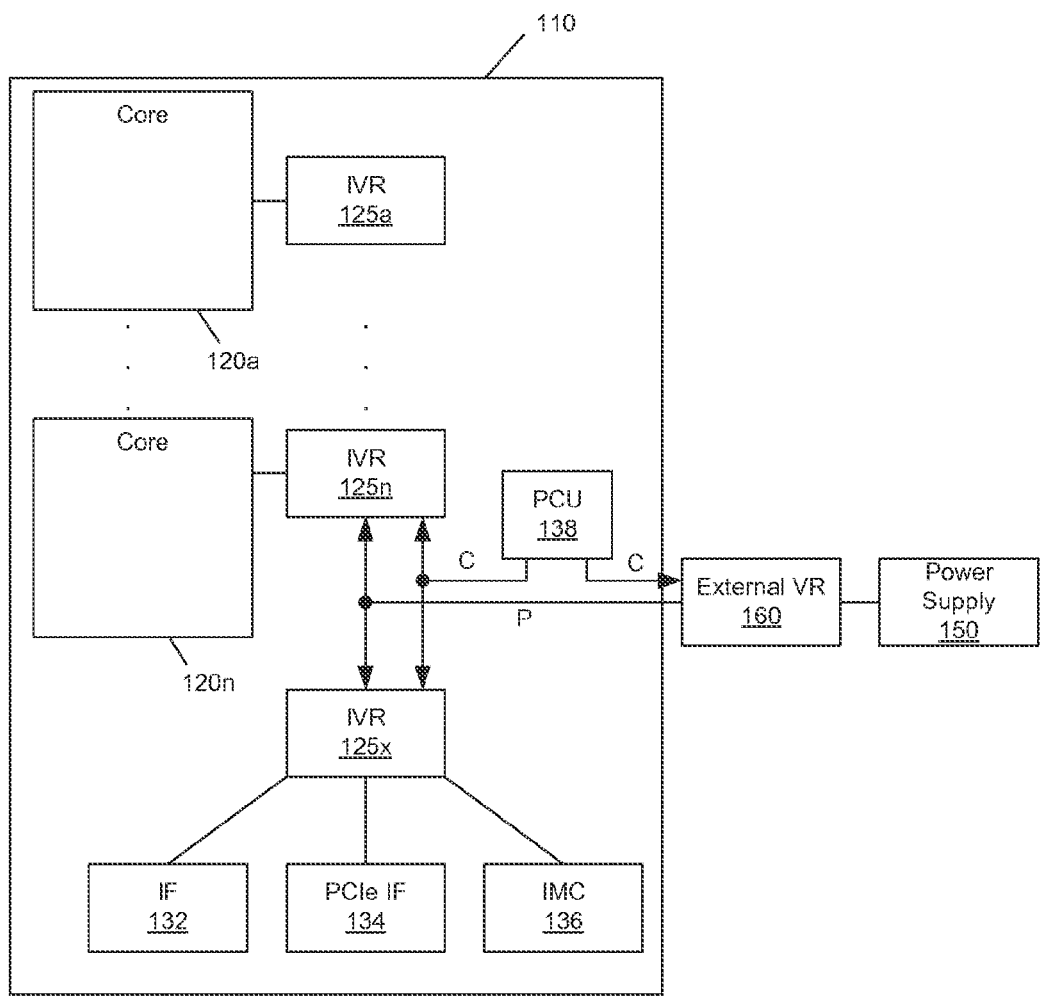
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). In addition, according to embodiments described herein, PCU 138 may base at least some power management and voltage and frequency control decisions on an effective stress on the processor, as determined by a stress detector of or associated with the PCU.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
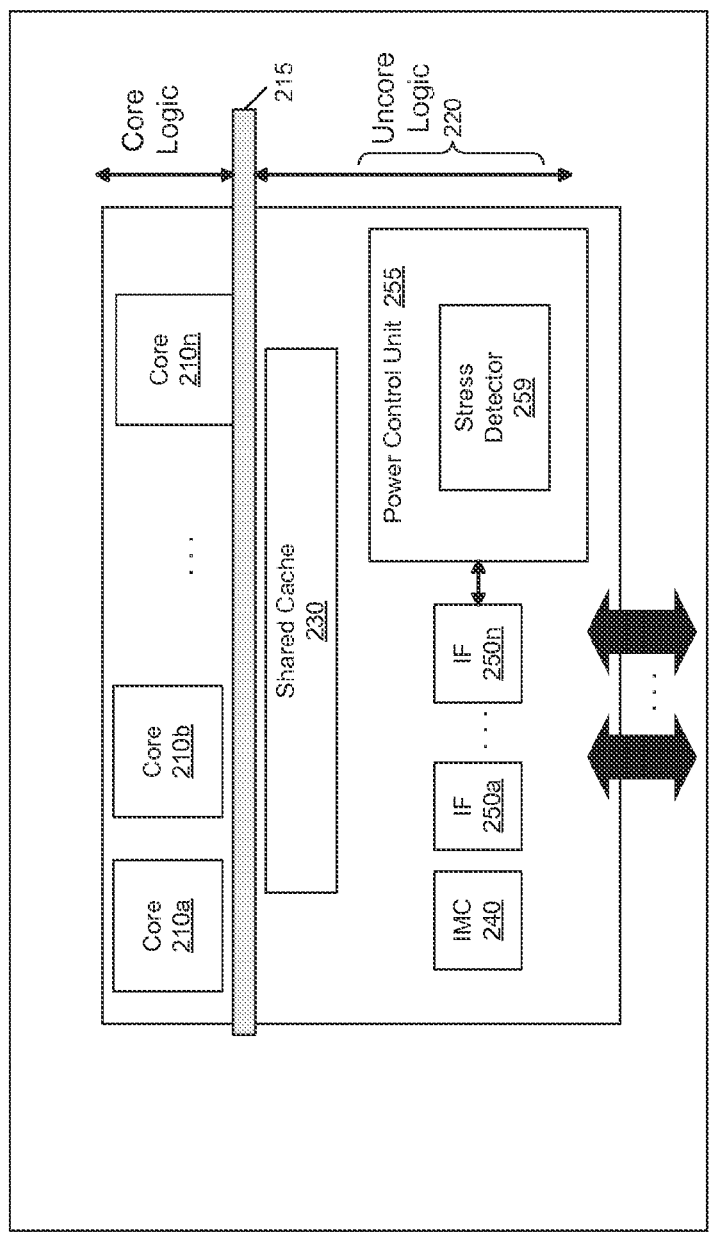
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255. In various embodiments, power control unit 255 may include a stress detector 259, which may be a logic to implement the effective stress analysis performed as described herein. Accordingly, stress detector 259 may receive an input of current operating parameters and update an accumulated effective stress level based on a calculation for the current stress that the processor is undergoing. In addition, based on this analysis, PCU 255 may update one or more operating parameters of the processor.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
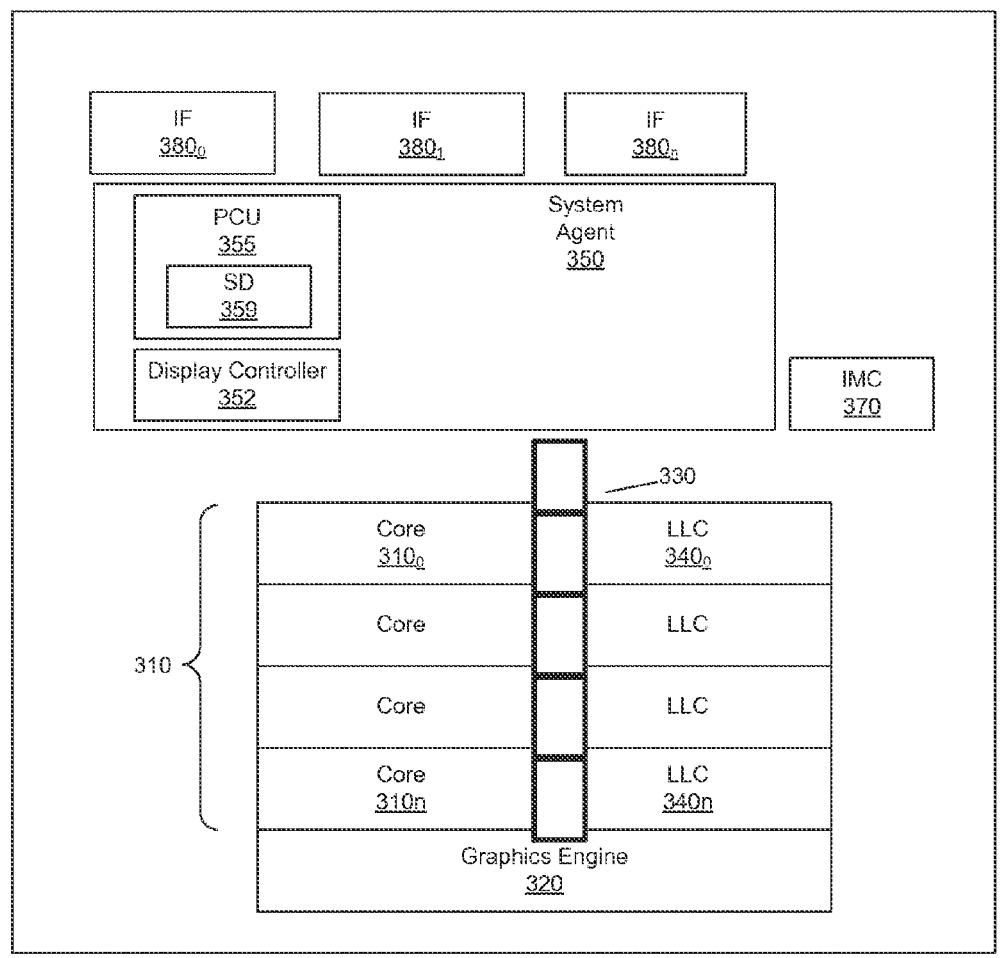
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include a stress detector 359, as described further herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. With particular reference to interface $380_0$, note that this interface may couple with PCU 355 to enable communication of the effective stress information determined in stress detector 359 to an off-chip (processor external) destination, such as to a storage (e.g., via a universal serial bus (USB) interface), a local area network destination (such as an IT system) or other destination. Although shown at this high level in the embodiment of FIG. 3, understand the scope of the present invention is not limited in this regard.

Figure 4:
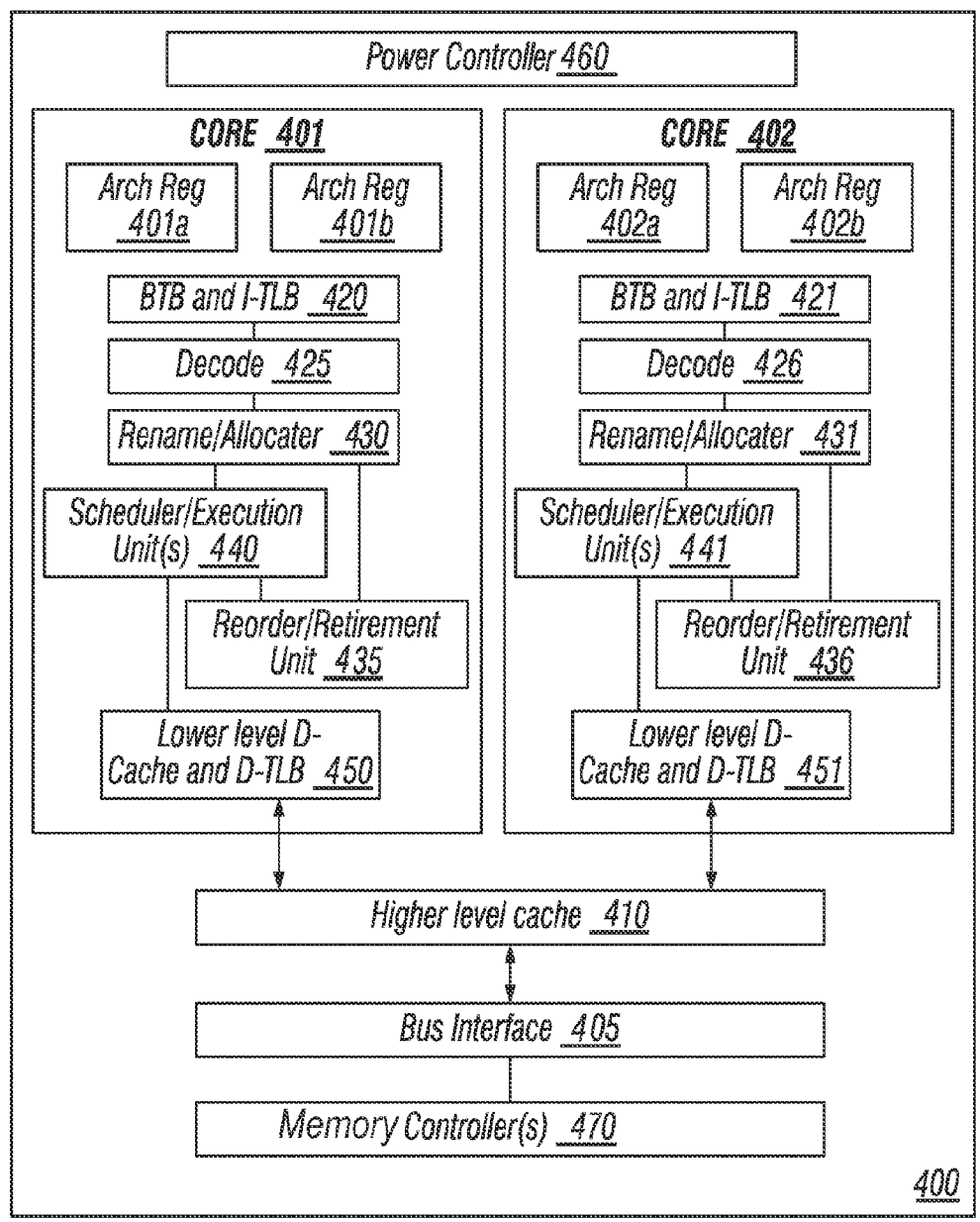
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers

401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
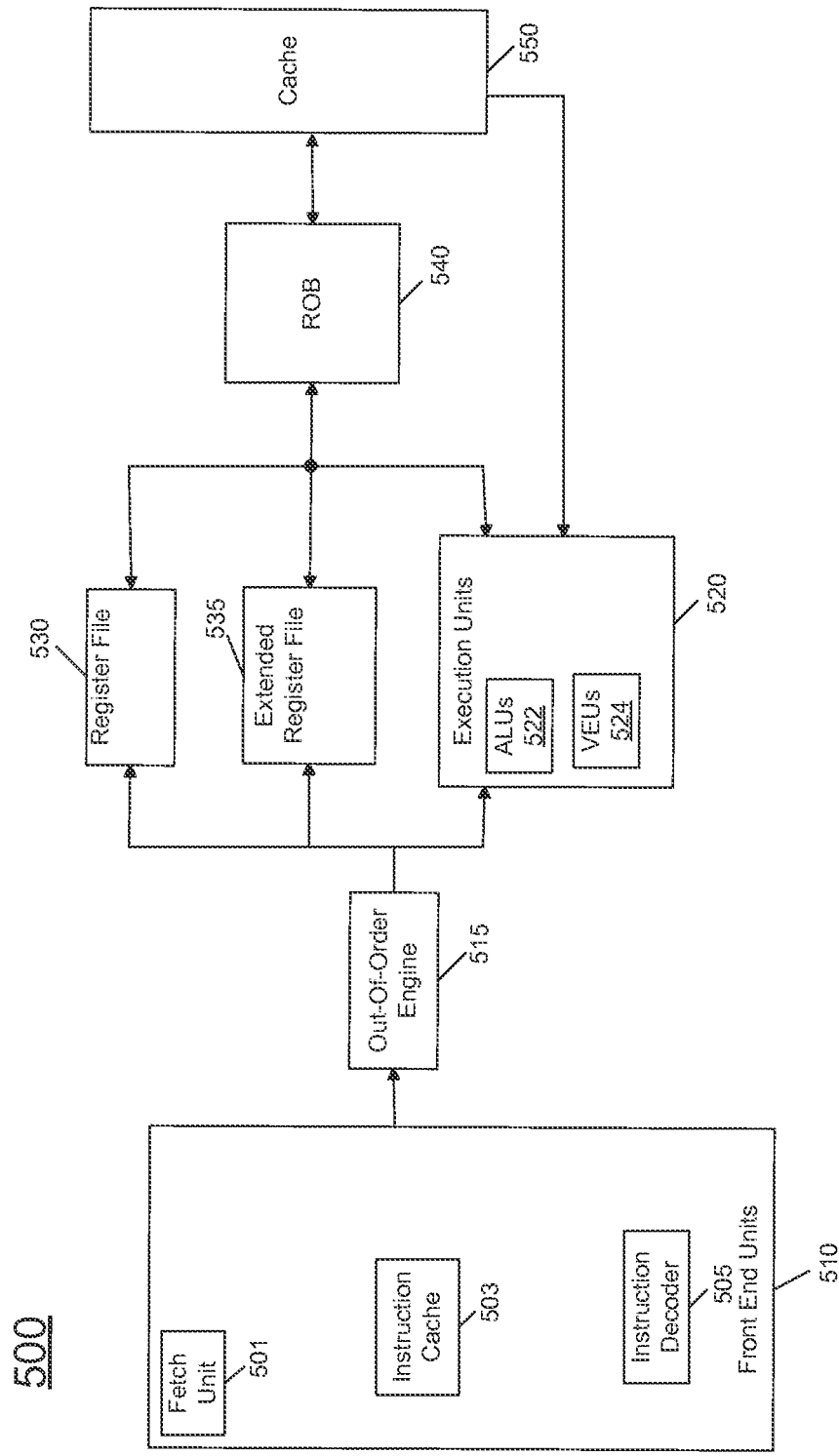
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
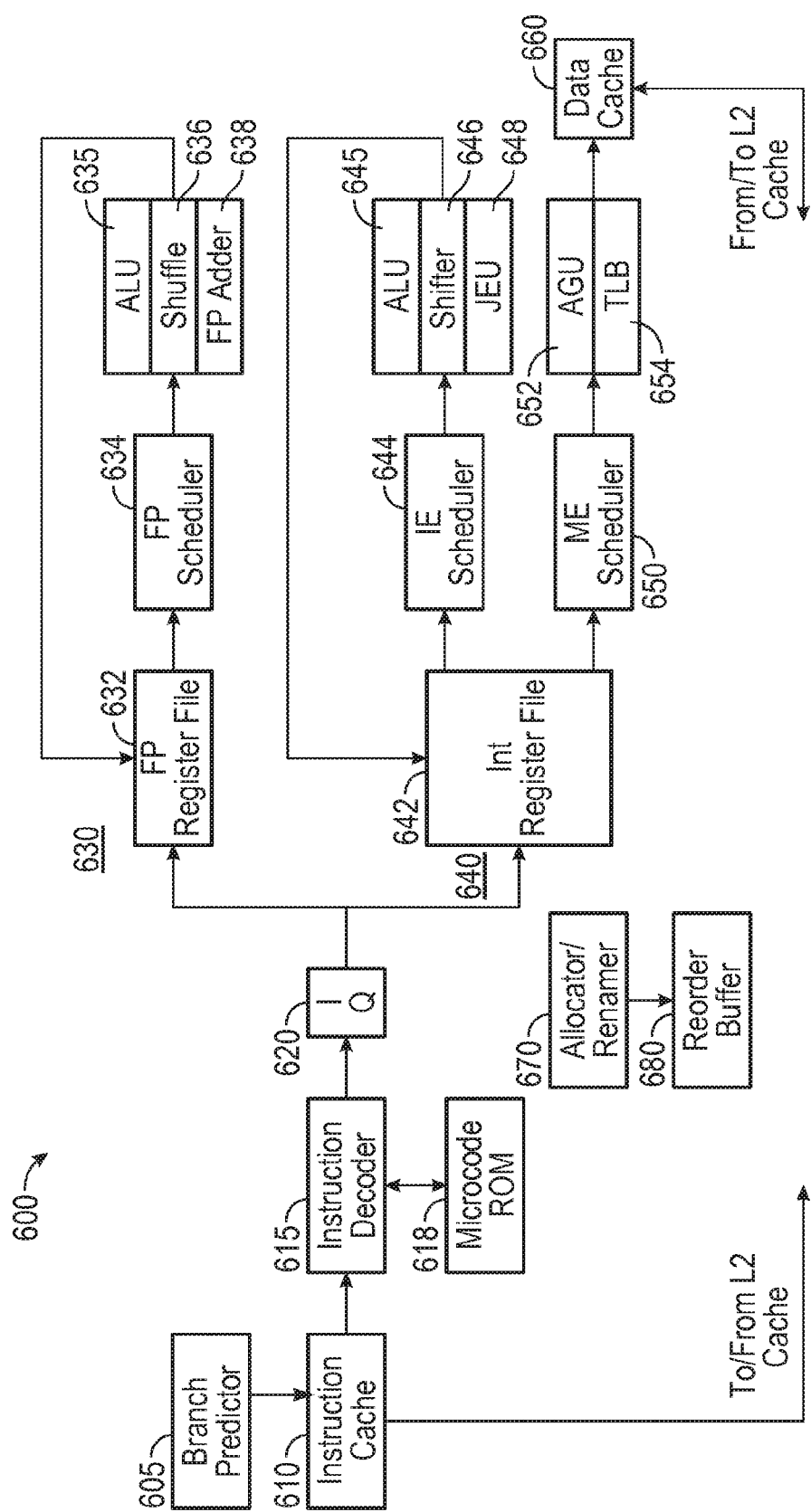
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
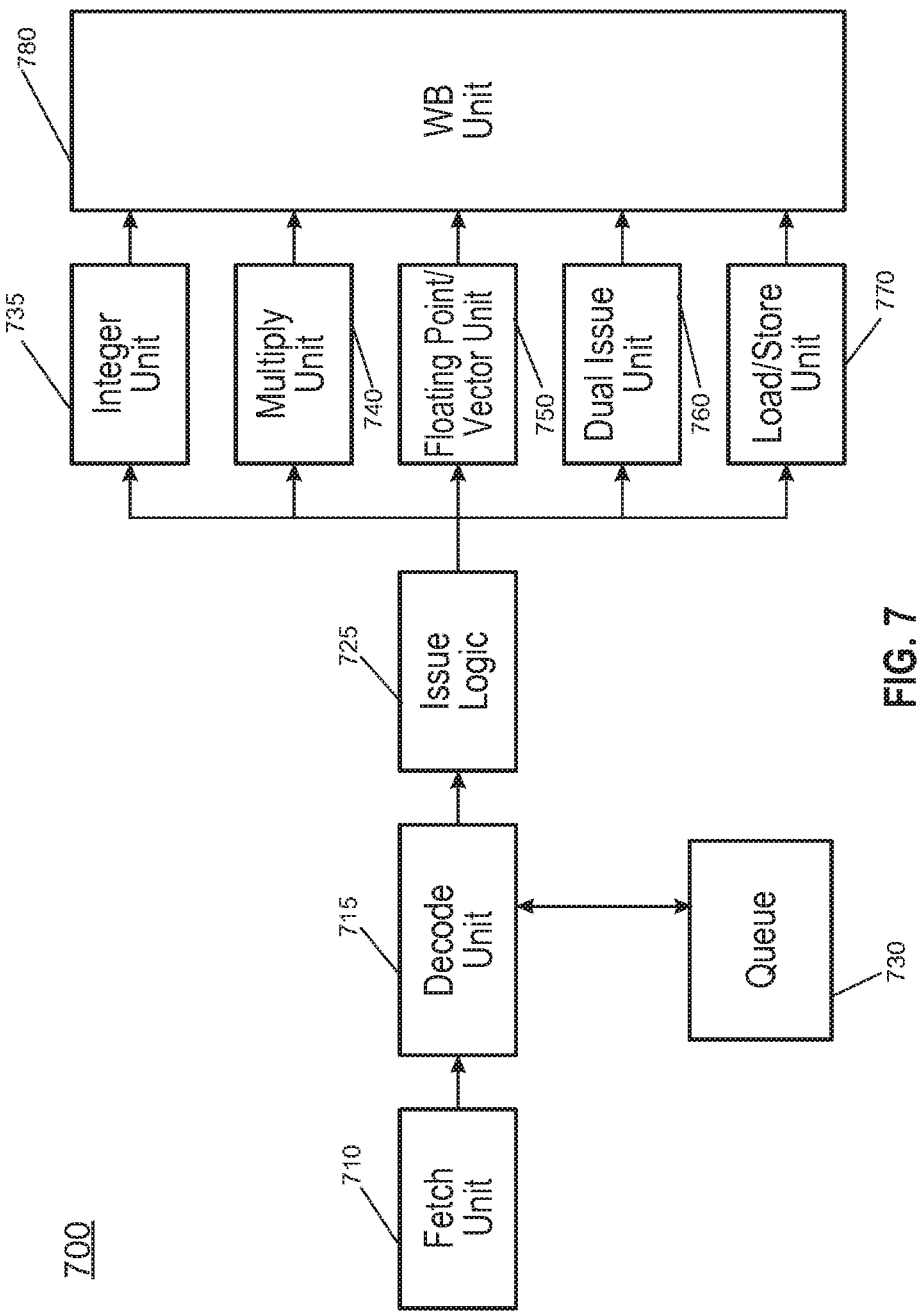
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
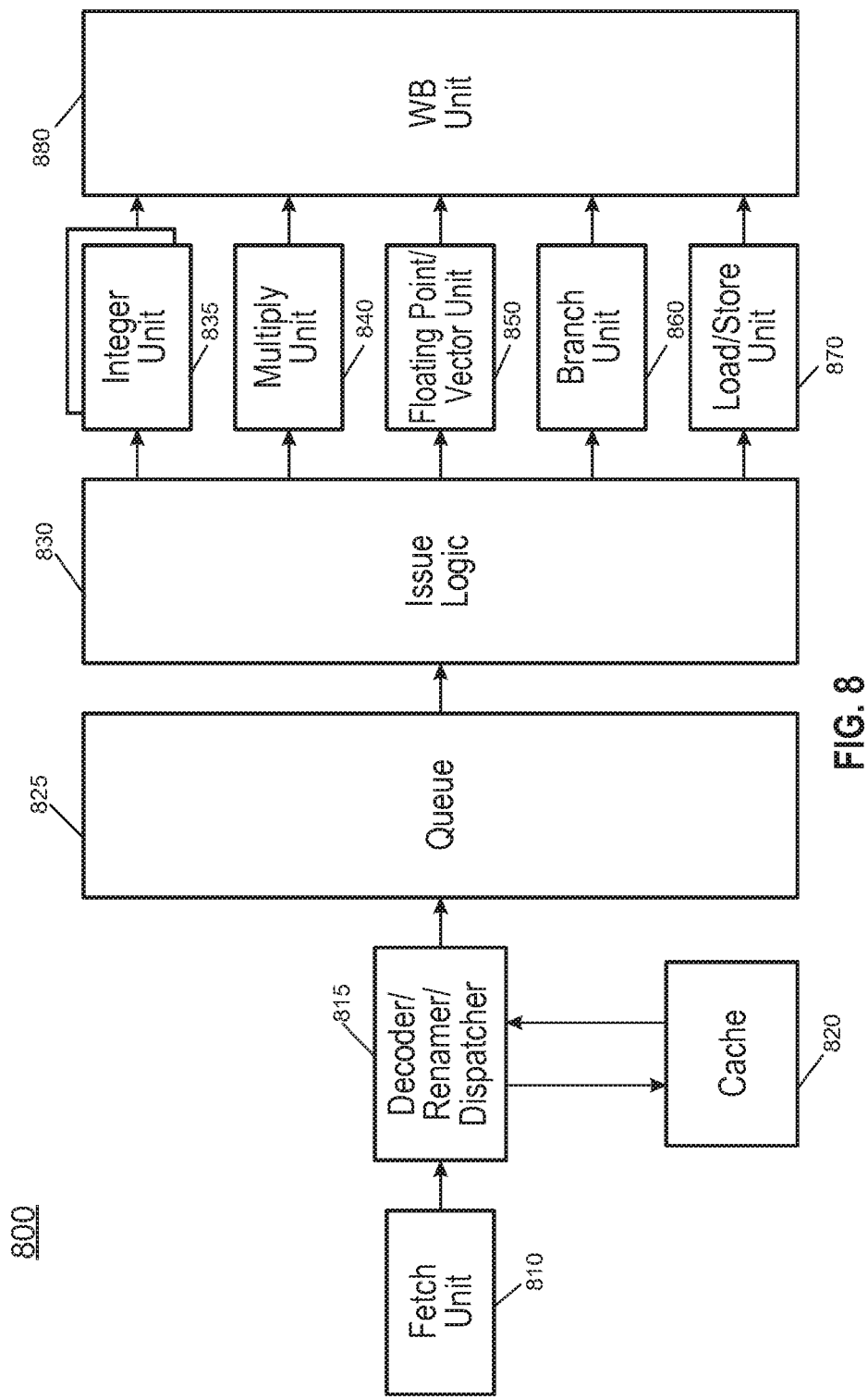
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
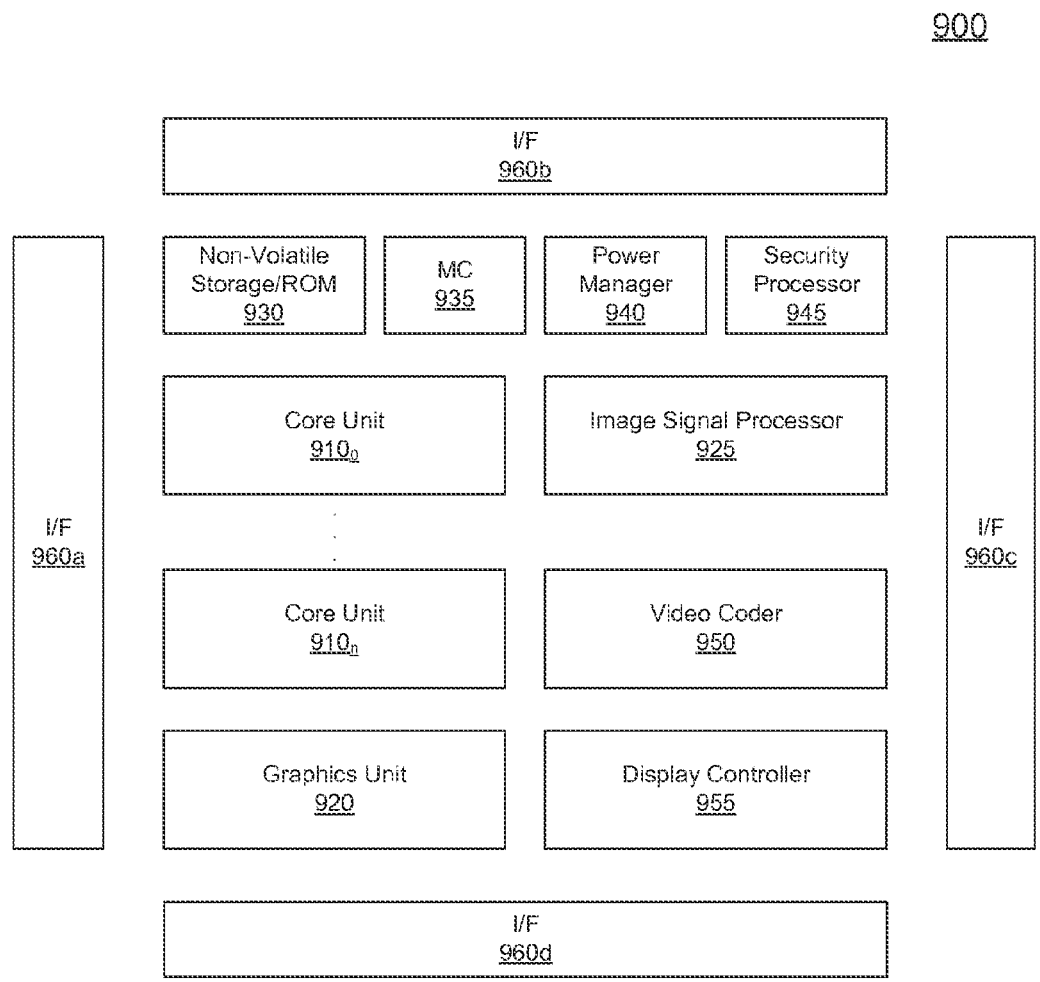
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units 910$_0$-910$_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management and stress detection and processor control techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
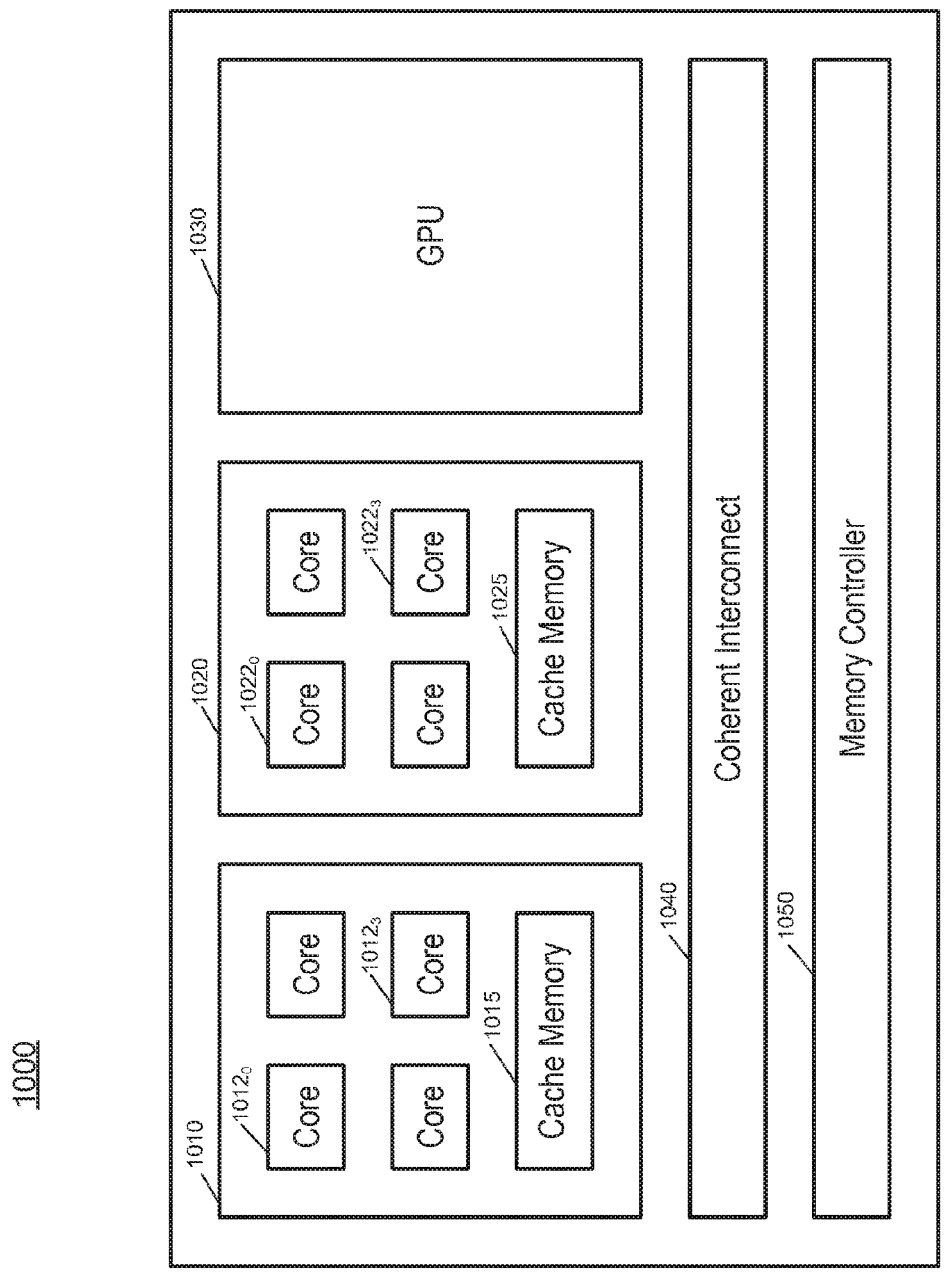
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
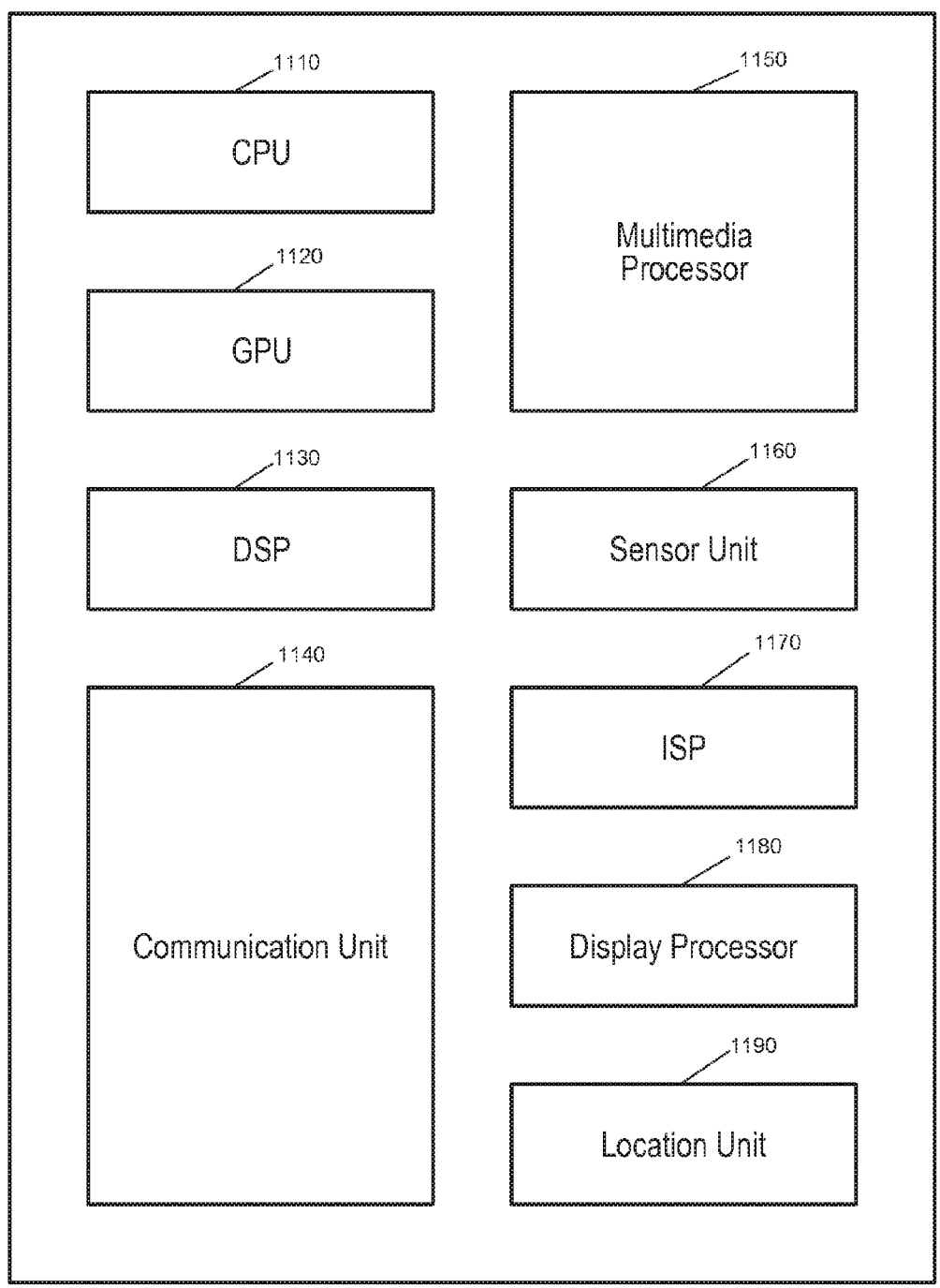
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
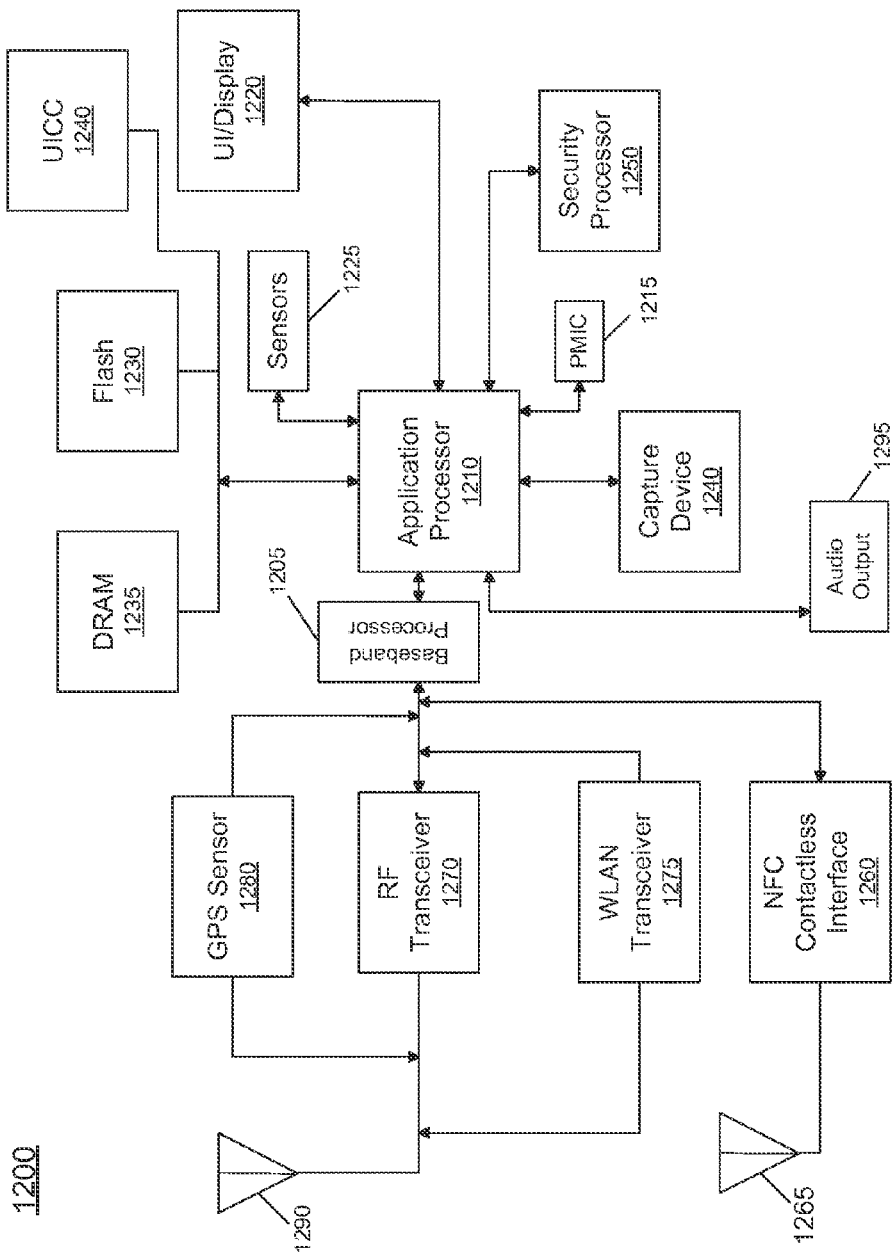
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. In some embodiments, stress detection may leverage at least certain of this information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200. In some embodiments, PMIC 1215 may control one or more components (including application processor 1210) responsive to effective stress information received from application processor 1210.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 13:
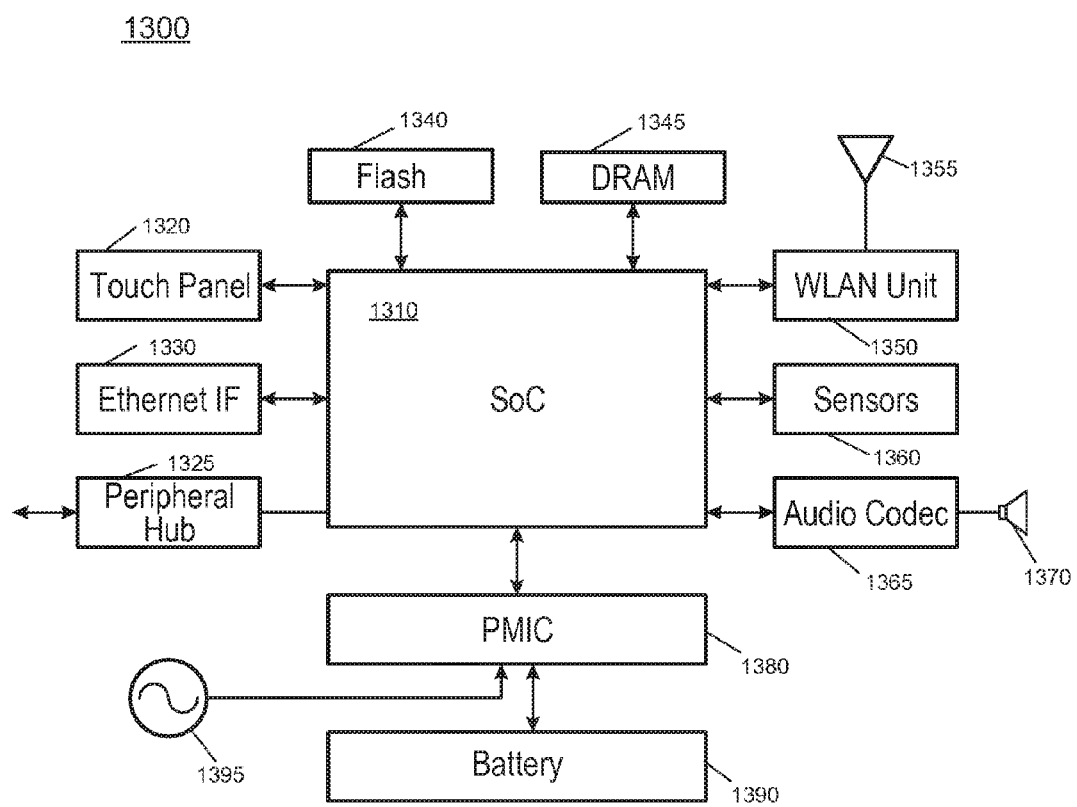
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental, usage and effective stress conditions, as described above. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
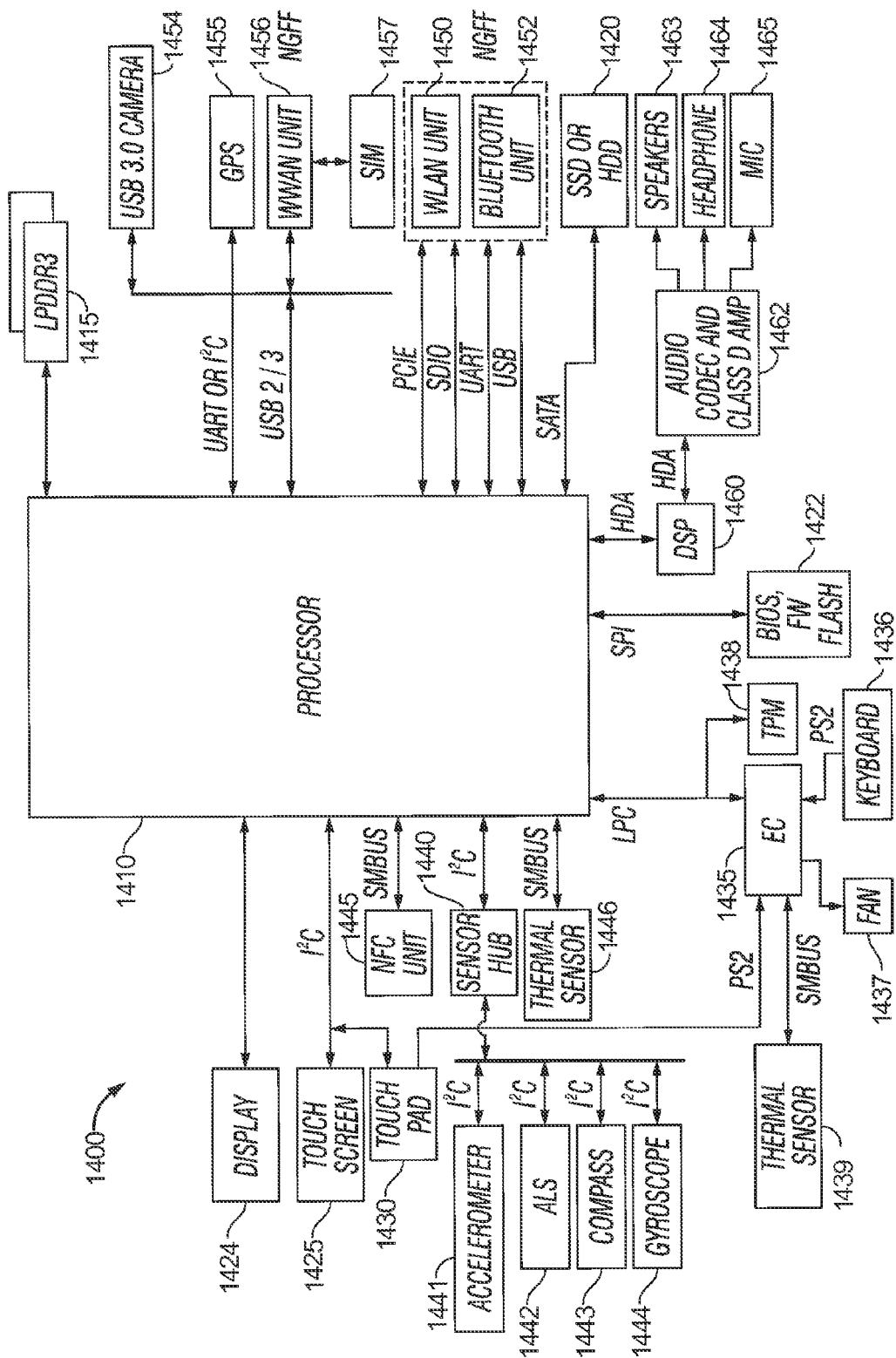
FIG. 14 is a block diagram of a representative computer system.

Referring now to FIG. 14, a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to an embedded controller 1435 via a PS2 interface. In some embodiments, embedded controller 1435 may provide the storage for effective stress information as described herein. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or I$^2$C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
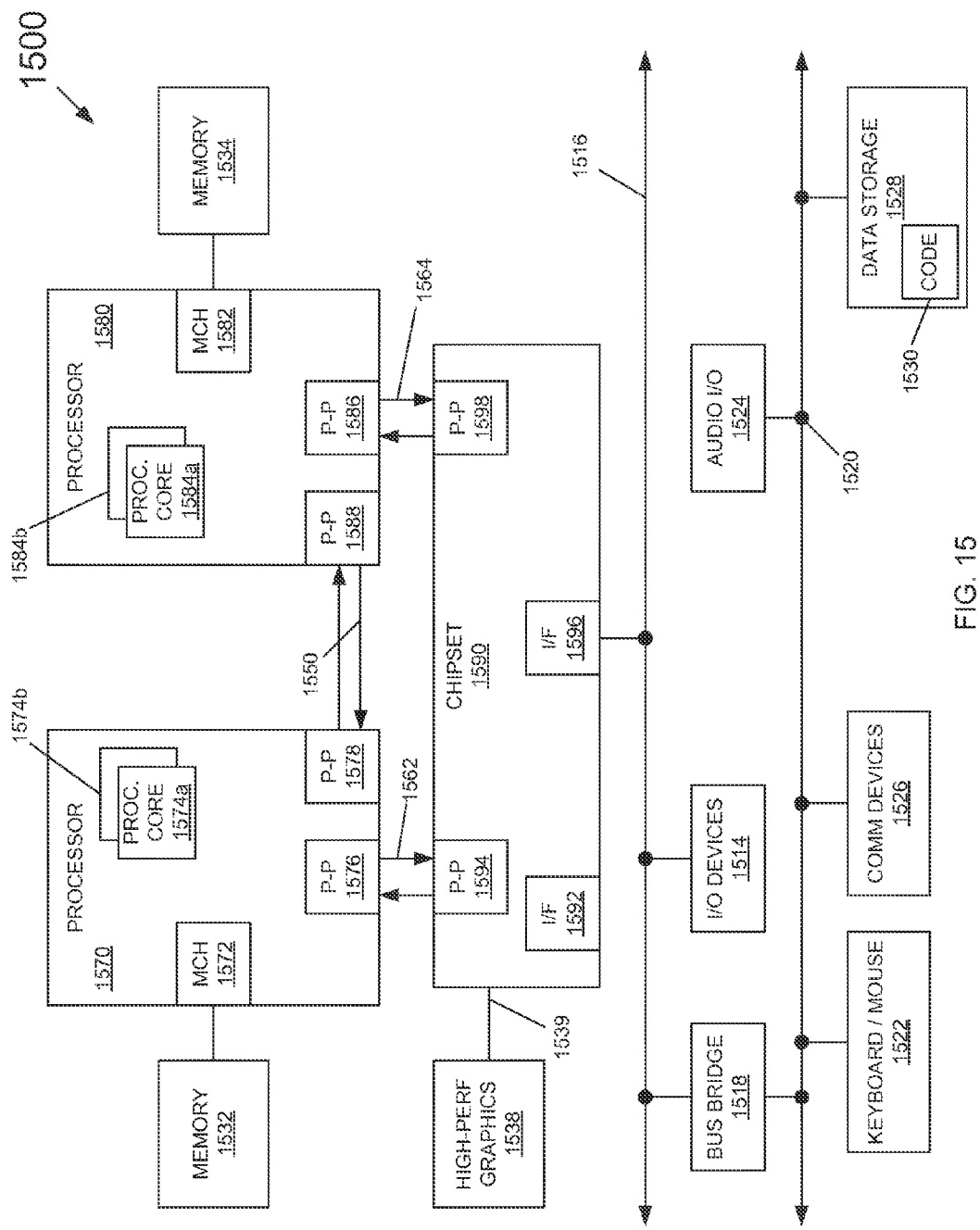
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU or other logic to perform an effective stress analysis and control one or more operating parameters of the processor based at least in part thereon, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

To determine lifetime statistical information such as effective stress on the processor, a stress detector may be provided. In one embodiment, the stress detector can be implemented with a so-called reliability odometer. The reliability odometer may be used to track the temperature, voltage, time (e.g., powered on or up time) or other stress generating factors that the processor undergoes. As one example, the odometer can be implemented in logic of a PCU or other controller of the processor. From this information, the odometer may calculate an effective reliability stress that causes the degradation. The effective stress can be accumulated since a first powering on of the processor. When the processor is fresh (non-stressed) at a beginning of its lifetime, it can work with better performance and power efficiency, and without suffering from guard bands protecting against aging. Note that the measure of lifetime can be relative and need not be from birth to date. Stated another way, beginning of life counting can be at some other time than manufacture. Thus, the lifetime measures herein can be a partial time interval such as, but not limited to, end of manufacturing, first use out of the box, or another time period.

To maintain information regarding the effective stress, embodiments may further provide a non-volatile storage to accumulate the effective stress information ($S_{eff}$ data) over multiple boot and shutdown cycles. In one embodiment, a peripheral controller hub (PCH) may provide this non-volatile storage. And in such embodiments, the processor may read and write data to the PCH, e.g., using a vendor defined message (VDM) structure. Note that in different implementations, the nonvolatile memory can be flash, battery or sustained voltage backup, or even stored in disk. Still further, instead of PCH, another non-volatile storage may maintain this information, such as a storage associated with an embedded controller (EC), where data may be stored in an encrypted form.

During processor operation, as the product ages due to the applied stress, embodiments may dynamically update voltage and frequency settings of the processor, graphics subsystem, memory, or any other subsystem or agent. In one embodiment, PCU logic may perform the stress calculations and trigger any appropriate changes in the product settings over time. However, at the beginning of processor lifetime, the settings of $V_{min}$ and $F_{max}$ can be at the maximum rated parameters.

The logic may be coupled to receive temperature and voltage inputs, and upon a change, the effective stress can be calculated, e.g., as an over time integral of $S_{eff}$, which is a function of voltage, temperature, current or any other stress generator. From this information, an effective stress can be calculated based on the physical functions that describe the stress impact on degradation. For example, NBTI stress is an exponential function of voltage and temperature, and the effective stress is an integral of the accumulated stress over time. Although the scope of the present invention is not limited in this regard, every time interval the effective stress is re-calculated using the temperature or voltage of the processor, and accumulated with a value corresponding to the previously accumulated stress. When the value of this effective stress, which can be stored in a register, counter or other storage reaches a predefined threshold, the logic may implement a change in the voltage/frequency setting of the product. For example, a higher voltage may be provided to sustain the same frequency, or the processor may run at a lower frequency for a given voltage. It is understood that the stress can be calculated based on presence of voltage, such as by measure of up time, rather than purely based on voltage level.

To provide for communication between the PCU and the PCH, an interconnect and logic may be present. Furthermore, embodiments may use fuses and registers on the processor to update settings, and can use a security processor such as a manageability engine to manage updates and reads to the non-volatile memory that stores the effective stress information, which can be in a flash memory of the PCH, in one embodiment. Alternatively, the device itself can include a non-volatile storage to store the accumulated stress value. Alternatively an external memory such as on board memory via an EC, disk drive, etc., can be used as the storage.

Figure 16:
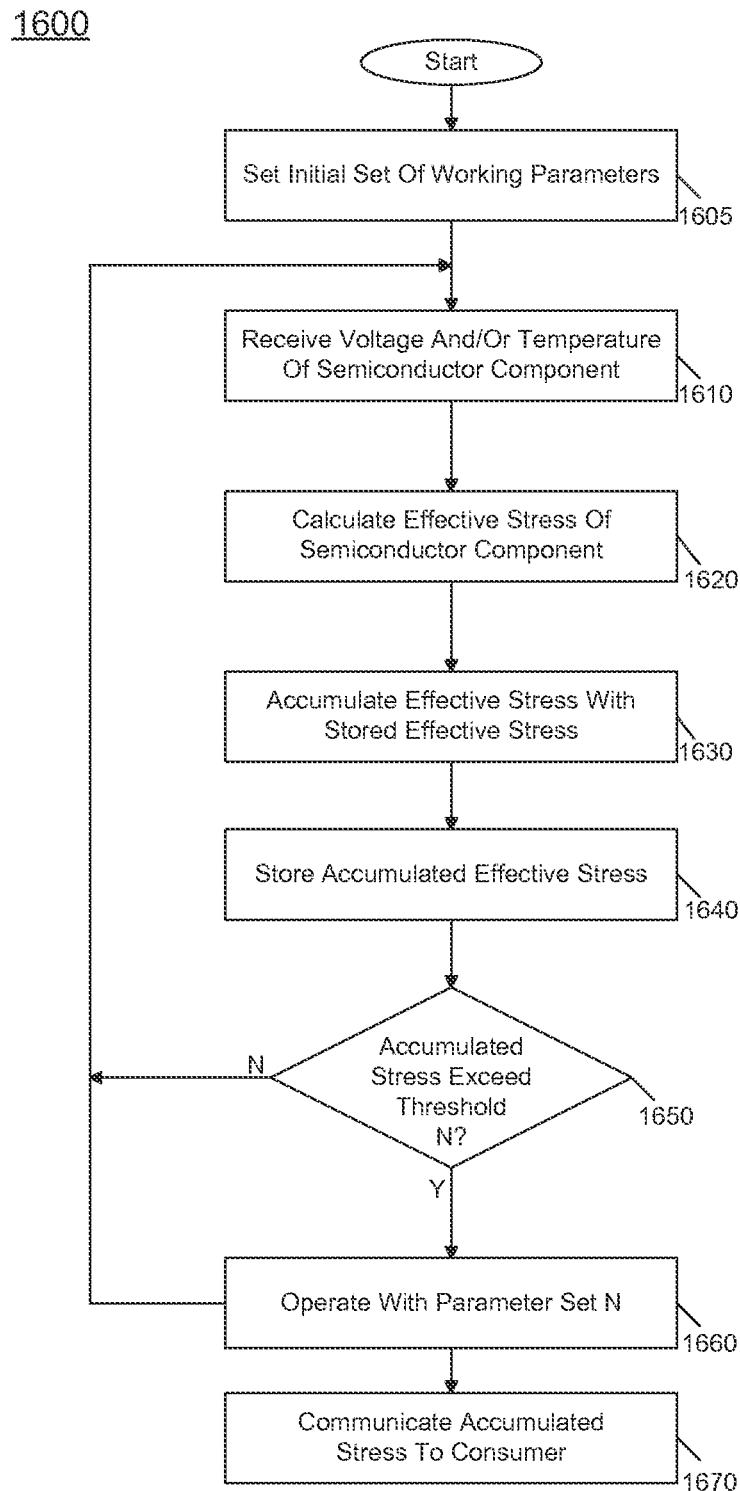
FIG. 16 is a flow diagram of a method in accordance with an embodiment of the present invention.

Referring now to FIG. 16, shown is a flow diagram of a method in accordance with an embodiment of the present invention. As shown in FIG. 16, method 1600 may be implemented within a power control unit or other controller, which may be a microcontroller, state machine or logic block of a processor or other semiconductor device. For purposes of illustration the discussion of FIG. 16 is in the context of a processor. Thus as seen at block 1605, an initial set of working parameters can be set at the beginning of lifetime for that part. These working parameters can be of various operating parameters, such as nominal voltage for a given operating frequency, temperature, maximum current ($I_{ccmax}$) and so forth. These parameters may be the maximum available parameters for the given device, and can be set during manufacture of the device and stored, e.g., via fuses or non-volatile storage.

Control then passes to block 1610, which occurs during normal operation, where at least one of a current voltage and temperature of the semiconductor component (e.g., processor) may be received. As one such example, these parameters may be received within the power control unit. Although only discussed with these two input parameters, understand the scope of the present invention is not limited in this aspect, and in other embodiments additional operating parameters such as activity factor, device loading, and transition time may also be received.

Method 1600 continues by calculating an effective stress on the semiconductor component (block 1620). More specifically, this effective stress may be calculated based on one or more of the received operating parameters. Different calculations can be performed based on the parameters received as well as the type of device and characterization information for the given type of device. Such calculations can be used to determine NBTI degradation, gate oxide degradation (TDDB), and interconnect degradation, as examples.

Control next passes to block 1630 where the calculated effective stress can be accumulated with a stored effective stress, which may be stored in a non-volatile storage. This updated effective stress value thus includes the newly calculated effective stress and a sum of previously determined effective stress values, e.g., from a beginning of the lifetime of the device, in this case a processor. This updated effective stress value then can be stored (block 1640). As an example, this updated value can be stored back to the non-volatile storage from which the previously stored effective stress value was obtained.

Still referring to FIG. 16, next control passes to diamond 1650 where it may be determined whether the accumulated effective stress value exceeds a given threshold value. As examples, multiple thresholds may be available, each corresponding to a given level of accumulated stress, e.g., corresponding to an approximate effective age of the device. As one such example, there can be N threshold levels, each approximately corresponding to a year's worth of device usage. While the scope of the present invention is not limited in this regard, each threshold value may be set at a level at which the effective stress has reached a point at which a corresponding degradation of performance is expected and thus certain measures may be initiated. If it is determined at diamond 1650 that the given threshold has not been exceeded, control passes back to block 1610 where a further iteration can be performed to again update the effective stress value, e.g., when a voltage or temperature change has been determined to have occurred.

For example, in the context of a processor and assuming a first (initial) threshold level is active, the processor may operate at least at its maximum rated frequency and at its minimum voltage level. Of course, because there is no degradation over the lifetime that the device has been operating, it can operate at a higher turbo mode frequency (of which there can be multiple bins made available by avoiding a guard band) depending on a load on the processor.

If instead the threshold level is exceeded, control passes to block 1660 where a new parameter set may be selected for use so that the semiconductor component can be operated at a given parameter set. Thus if it is determined that the accumulated effective stress exceeds the threshold, the semiconductor component can be operated with degraded parameters. For example, the processor may be controlled to operate at less than a maximum rated frequency, and furthermore, in some embodiments the processor may operate at a higher than minimum voltage level. This control can be enabled by updating parameter settings, e.g., stored in a non-volatile storage, fuses or so forth.

As seen in the embodiment of FIG. 16 there can be multiple thresholds against which the accumulated effective stress is measured and when the value exceeds the given threshold, a different combination of operating parameters, e.g., degraded voltage and frequency levels can be used for the device settings. An indication of the appropriate threshold level to use for the analysis at diamond 1650 can be stored, e.g., in a configuration register of the PCU.

Still referring to FIG. 16, in addition to updating a parameter set when the accumulated stress exceeds a given threshold, information regarding the accumulated stress may be communicated from the system. Thus as seen in FIG. 16, control passes from block 1660 also to block 1670 where the accumulated stress can be communicated to a consumer. Note that the given consumer can vary depending on usage scenario and programming. In different situations, any of an end user of the system, IT personnel of a corporate entity, datacenter or cloud service provider or another interested party, such as processor vendor, OEM or other manufacturer may be the consumer. Of course in other situations, the effective stress information may be communicated to multiple parties.

Note that in the embodiment of FIG. 16, the communication may occur responsive to the threshold stress level being exceeded. Of course, in other situations the accumulated stress information may be communicated at different time occurrences, such as according to a periodic schedule, responsive to a request from the consumer, or so forth. Also understand that the communication of accumulated stress information may occur even when a given threshold is not exceeded. Also, in addition to the accumulated stress information, other lifetime statistical information, which may be maintained within the PCU or other processor hardware also may be communicated. For example, information regarding up time, and/or time in a turbo mode, or so forth may be maintained. Although shown with this particular implementation in the embodiment of FIG. 16, understand the scope of the present invention is not limited in this regard.

Figure 17:
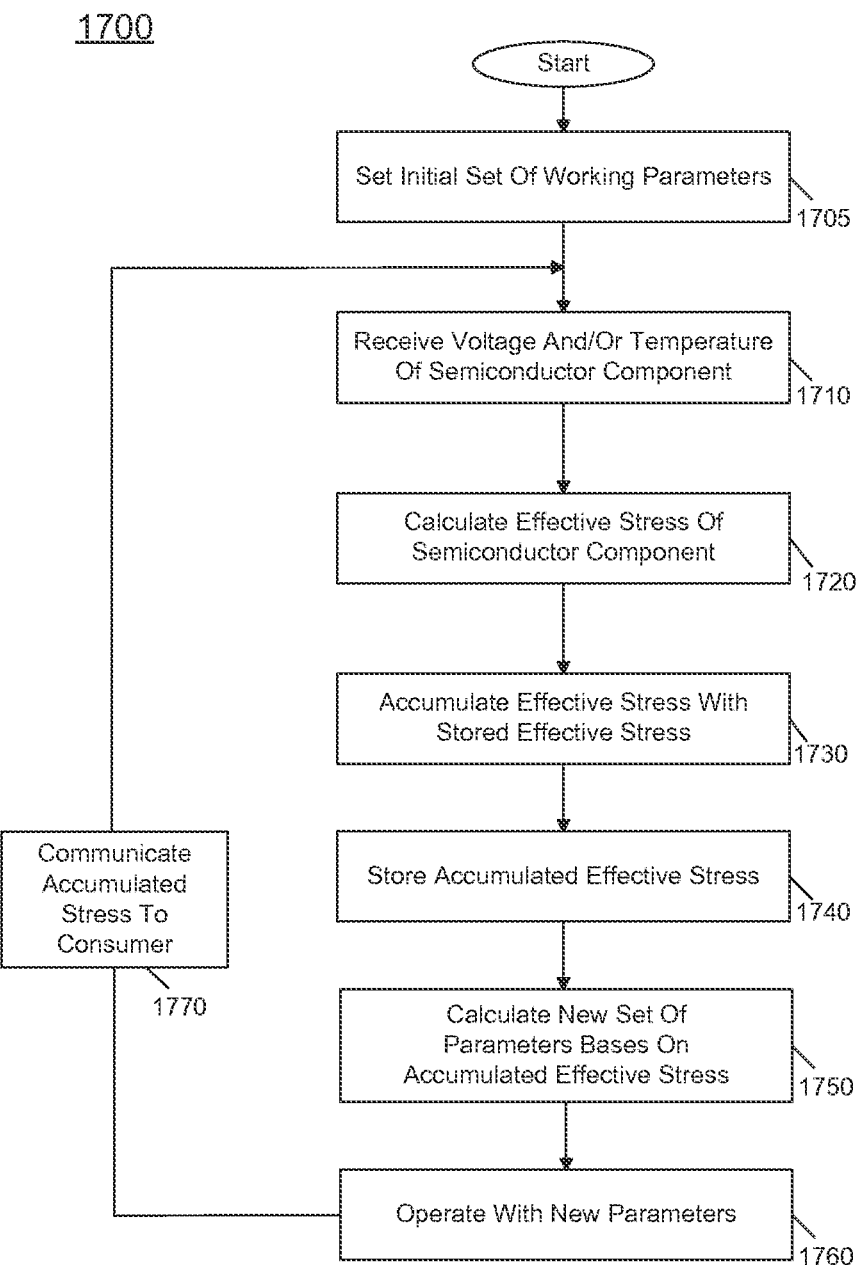
FIG. 17 is a flow diagram of another method in accordance with an embodiment of the present invention.

Referring now to FIG. 17, shown is a flow diagram of another method in accordance with an embodiment of the present invention. As shown in FIG. 17, method 1700 is an alternate flow diagram for controlling and operating parameters of a processor based on an effective stress level of the processor. In general, method 1700, which may similarly be performed by a stress detector of a PCU, may generally proceed as in FIG. 16. However, rather than comparing an accumulated effective stress to a threshold, instead this value is used to calculate new parameters that are then used for processor operation.

Specifically as seen in FIG. 17, at block 1705 an initial set of working parameters can be set, as described above with regard to FIG. 16. Then during normal operation, one or more of voltage and temperature, in addition to potentially other operating parameters, may be received by the PCU (block 1710). From this information, an effective stress can be calculated (block 1720). In addition, this effective stress value can be accumulated with the stored effective stress (block 1730) and this accumulated effective stress level can be stored (block 1740), e.g., to a non-volatile storage of a PCH.

Referring still to FIG. 17, method 1700 differs in that a new set of parameters for operating a processor can be calculated based on the accumulated effective stress (block 1750). For example, in one embodiment the voltage and frequency at which the processor can operate can be calculated according to the Arrhenius equation, which represents temperature dependent aging, or other equations. Control thus passes to block 1760 where the processor can be operated with these new calculated parameters.

As further shown in FIG. 17, in addition to calculating a new set of parameters and operating the processor according to this parameter set, information regarding the accumulated stress may be sent to a consumer (block 1770). Note that such communication may occur as described above, e.g., to a given one or more entities. Although shown with this particular implementation in the embodiment in FIG. 17, understand the scope of the present invention is not limited in this regard.

Figure 18:
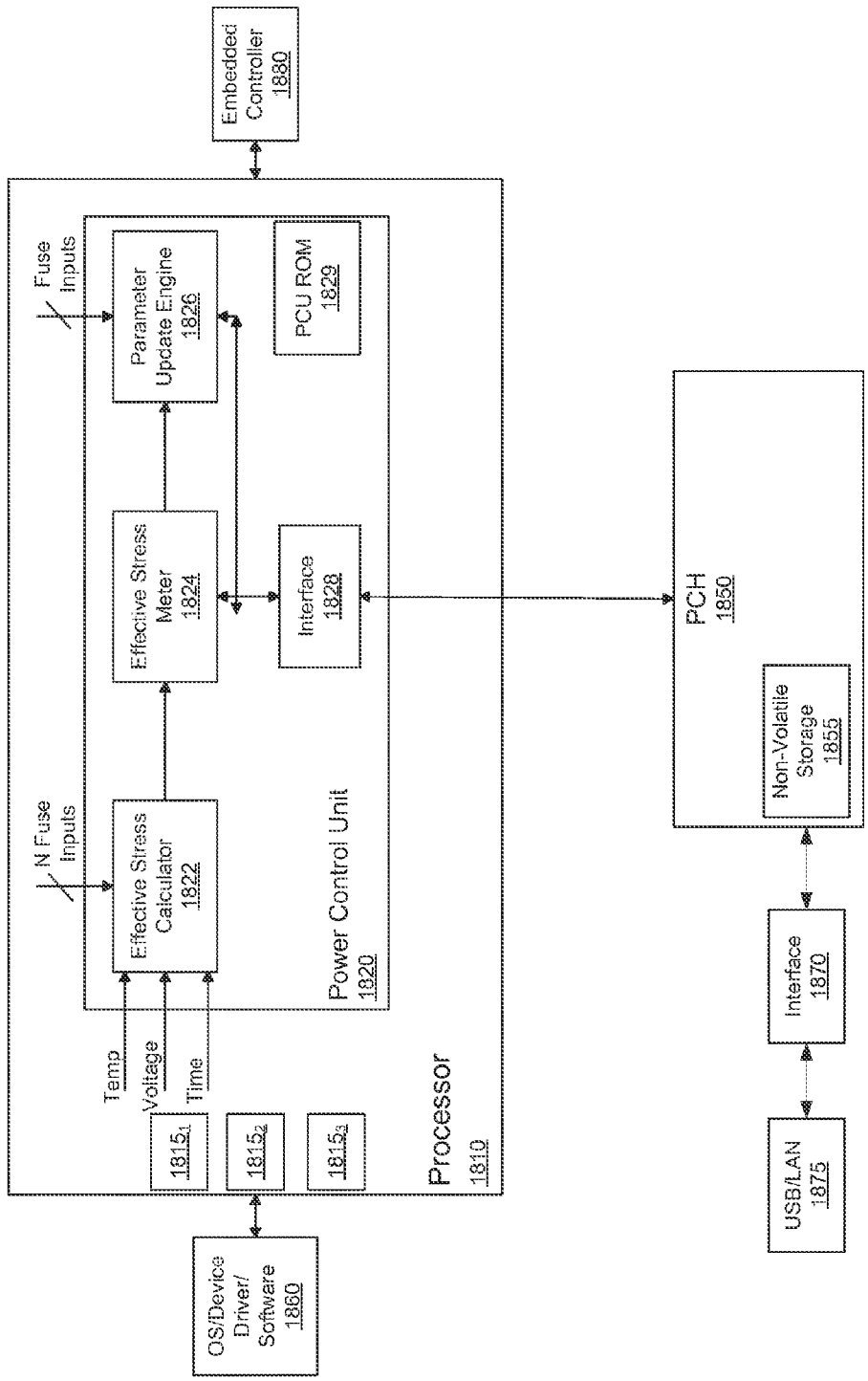
FIG. 18 is a block diagram of a portion of a system in accordance with an embodiment of the present invention.

Referring now to FIG. 18, shown is a block diagram of a portion of a system in accordance with an embodiment of the present invention. As shown in FIG. 18, system 1800 includes a processor 1810 that can be coupled to a PCH 1850. Understand that processor 1810 may be a multicore processor including multiple processor cores, cache memories and other components. Note that in some embodiments system 1800 may be implemented as a system on chip (SoC) in which both processor 1810 and PCH 1850 are configured on a single semiconductor die. Also understand that for ease of illustration, only limited components are shown.

As first seen, processor 1810 includes a plurality of domains $1815_1$-$1815_3$. Although the scope of the present invention is not limited in this regard, these independent domains, each of which may include various general-purpose processing units, graphics processing units and/or other processing units each may receive independent power and clock signals and thus may operate at independent operating voltages and operating frequencies. In some embodiments, first domain $1815_1$ may be a core domain that includes a plurality of cores. In turn, second domain $1815_2$ may be a graphics domain including one or more graphics engines such as graphics processing units. Further, third domain $1815_3$ may be an independent domain including, e.g., dedicated processing units such as various fixed function units. Alternately, third domain 1815 may be another core domain, e.g., of an asymmetric core design. For example, as mentioned above in some embodiments a multicore processor may include heterogeneous cores, e.g., in-order cores and out-of-order cores.

As seen, PCU 1820 may include an effective stress calculator 1822 that may receive incoming operating parameter information including temperature, voltage and time. In addition, various fused inputs can be received by the calculator. These fused inputs may be a set of constants and/or other coefficients. Based on these values and the incoming operating parameter information, stress calculator 1822 can calculate an effective stress for the current parameters of the processor. This effective stress can then be accumulated with a stored effective stress value in an effective stress meter 1824. As seen, stress meter 1824 may be coupled to an interface 1828 that in turn communicates with PCH 1850, which as shown includes a non-volatile storage 1855 that can store the accumulated effective stress value. Accordingly, stress meter 1824 may perform an integration to thus accumulate the calculated effective stress from stress calculator 1822 with the stored value from storage 1855. This accumulated effective stress value can then be stored back to the non-volatile storage. In addition, as shown in FIG. 18, the accumulated effective stress level can be provided to a parameter update engine 1826. As seen, update engine 1826 may further receive a plurality of fused inputs, which may correspond to various coefficients and/or constants that can be used by the update engine to thus calculate one or more operating parameters based on the accumulated effective stress level.

As further seen in FIG. 18, PCU 1820 may further include a read-only memory (ROM) 1829 that may store code that can be executed by one or more of stress calculator 1822, stress meter 1824 and update engine 1826. Generally, all of the components shown in PCU 1820 thus may be considered to be a stress detector that can be implemented by any combination of logic including hardware, software, and/or firmware. Although shown at this high level in the embodiment of FIG. 18, understand that further components may be used to perform a stress analysis in accordance with an embodiment of the present invention. In addition, other logic such as scheduling logic may be present within processor 1810 to schedule workloads to the various processing agents of the processor.

Still referring to FIG. 18, various software 1860 may communicate with processor 1810 (e.g., to or from one or more of domains $1815_1$-$1815_3$ and/or PCU 1820). Such software may include one or more of an OS, one or more device drivers and various platform level software such as BIOS or other system software. Still further, using embodiments as described herein, this and other software (such as application software) may be configured to issue requests for lifetime statistical information including effective stress information, and various usage parameters, e.g., according to a predetermined interval and/or when various thresholds are met. The various software may alter operation based on the lifetime information, e.g., an OS may perform load balancing based on stress information, and/or a driver or BIOS may lower runtime power or temperature, e.g., based on lifetime or age information.

To enable communication of such information to external entities, an interface 1870 couples to PCH 1850 to enable the various lifetime statistical information stored in non-volatile storage 1855 to be communicated to a given entity. As such, interface 1870 may communicate with particular destinations such as a USB device 1875, e.g., a thumb drive or other USB storage device. Alternately, device 1875 may be a local area network (LAN) interface, such as a network interface controller (NIC) to enable communication, e.g., within or to a datacenter or cloud service provider context.

Still referring to FIG. 18, an embedded controller 1880 may couple to processor 1810. In some embodiments, embedded controller 1880, is a platform-level controller to perform certain platform-level power management actions and/or control of operating parameters of a platform (namely system 1800), e.g., based at least in part on the lifetime statistical information communicated to it.

Figure 19:
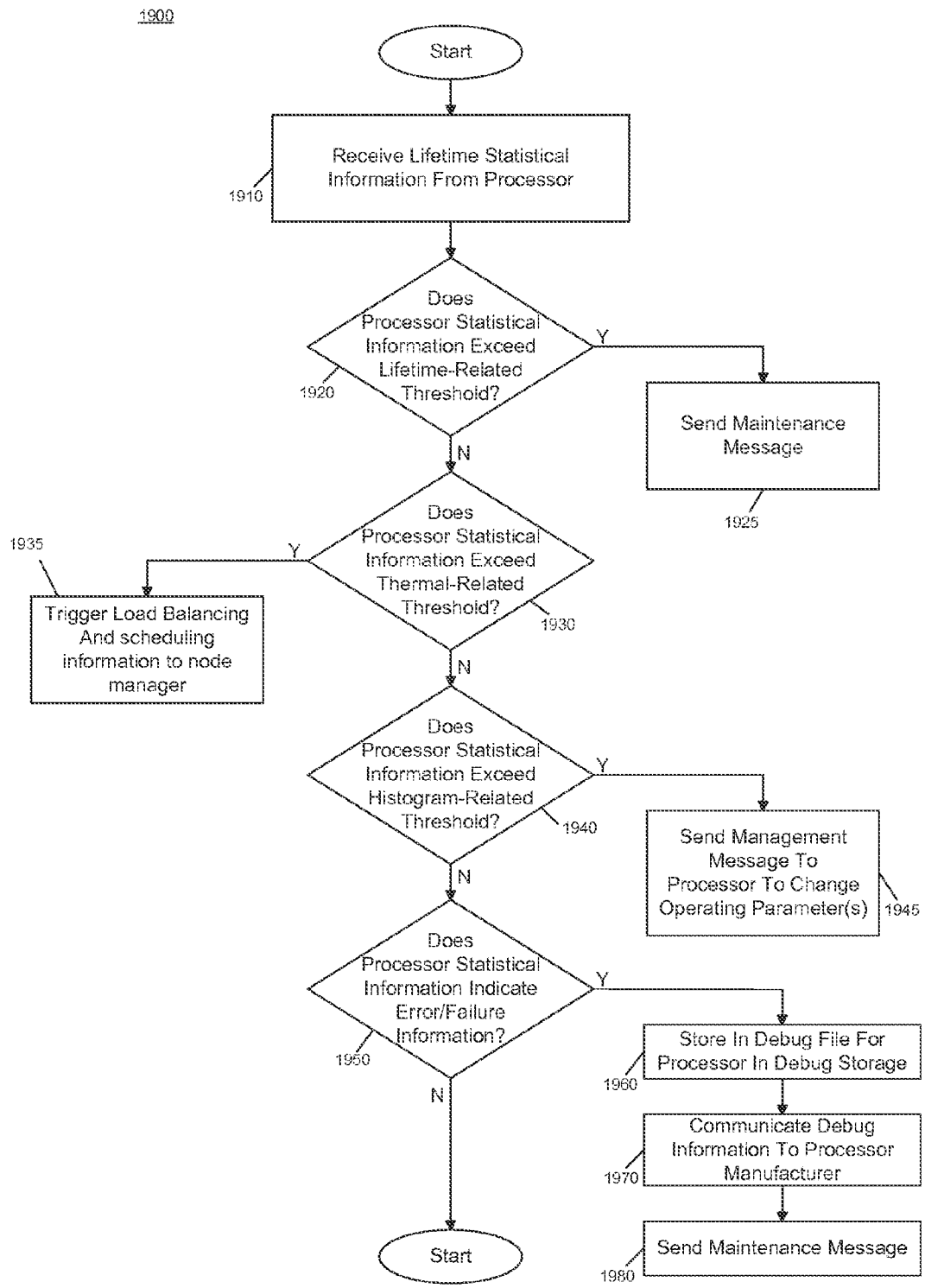
FIG. 19 is a flow diagram of a method in accordance with a further embodiment of the present invention.

Referring now to FIG. 19 shown is a flow diagram of a method in accordance with an embodiment of the present invention. Method 1900 of FIG. 19 illustrates various use cases based on lifetime statistical information maintained and communicated from a processor as described herein. In the context of a platform, method 1900 may be performed by a platform manager which can take many different forms depending on the type of platform including a processor maintaining, storing and communicating lifetime statistical information as described herein. For example, in the context of an end user computer system (e.g., a PC, tablet or smartphone) the operations may be performed by BIOS, OS or other system software. In the case of a managed platform, e.g., of a datacenter or cloud service provider, method 1900 may be performed by a data center management agent, such as a given data center management software entity. Of course many other possible agents may perform method 1900.

With reference to FIG. 19, method 1900 begins by receiving lifetime statistical information from a processor (block 1910). For ease of discussion, assume that the lifetime statistical information at least includes an effective stress parameter indicating an amount of stress applied to the processor over its lifetime. If this processor statistical information exceeds a lifetime-related threshold (as determined at diamond 1920), control passes to block 1925 where a maintenance message may be sent. For example, this maintenance message may be sent to a datacenter worker to cause a replacement of the processor (or a complete motherboard having the processor). Of course other maintenance messages such as a message to cause the worker or the processor to perform maintenance operations such as diagnostics to determine whether the processor is still suitable for operation instead may occur.

Still referring to FIG. 19, if the lifetime-related threshold has not been exceeded, control next passes to diamond 1930 to determine whether the statistical information has exceeded a thermal-related threshold. If so, a load balancing may be triggered (block 1935). Here scheduling information may be sent to a node manager, e.g., to cause either a workload transfer or an indication to prevent further workload from being provided to the processor of interest. In other instances, load balancing information may be sent to a scheduling logic of the processor to enable the logic to dynamically perform workload balancing, e.g., by offloading at least some of a scheduled workload to another processor (in the context of a multiprocessor system).

With reference still to FIG. 19, if no thermal-related threshold has been exceeded as determined at diamond 1930, control next passes to diamond 1940 to determine whether the statistical information exceeds a histogram-related threshold. As an example, this histogram-related threshold may relate to core utilization e.g., single vs. multi-threaded utilization that can impact amount of turbo mode headroom. Also if one core usage is higher than another, load balancing may be performed, or a target threshold may be set. If this is the case, control passes to block 1945 where a management message may be sent to the processor itself to change one or more operating parameters. For example, a configuration storage may be updated to place limits on one or more operating parameters such as operating frequency and/or operating voltage.

With reference still to FIG. 19, if no histogram-related threshold is exceeded, control passes next to diamond 1950 to determine whether the statistical information indicates error/failure information. If so, control passes to block 1960 where information regarding this error/failure may be stored in a debug file associated with the processor in a debug storage. In the context of a datacenter or cloud service provider, a debug storage may be provided to maintain debug information regarding various platforms of the provider, and other information for a debug file associated with the particular platform including the processor may be updated to store this error/failure information. Then at block 1970, this debug information may be communicated to a processor manufacturer. Note that such communication may occur in response to update of this debug file with error/failure information, or a report may be sent according to a schedule or periodic interval. In addition, a maintenance message may be sent, e.g., to IT personnel (block 1980). Understand while these particular uses of lifetime statistical information are shown in FIG. 19, many variations and alternatives are possible, and the scope of the present invention is not limited to use of statistical information for the particular items described in FIG. 19.

The following examples pertain to further embodiments.

In one example, a processor comprises: at least one core; a PCU coupled to the at least one core, the PCU including a stress detector to receive at least one of a voltage and a temperature at which the processor is operating and to calculate an effective reliability stress, and to maintain the effective reliability stress over a plurality of boot cycles; a non-volatile storage to store the effective reliability stress; and an interface to enable a user to access at least the effective reliability stress.

In an example, the stress detector includes a reliability odometer to receive the voltage and the temperature.

In an example, the non-volatile storage is present in a PCH coupled to the processor, and the PCU is to obtain the effective reliability stress from the PCH via a first message.

In an example, the PCU is to control a plurality of operating parameters of the processor based on the effective reliability stress and to update at least one of the plurality of operating parameters of the processor to a first degraded level when the effective reliability stress reaches a first threshold level of a plurality of threshold levels.

In an example, the interface comprises a USB controller to enable a USB device to communicate with the non-volatile storage.

In another example, the interface comprises a network interface controller to enable the user to communicate with the non-volatile storage via a remote system.

In an example, an embedded controller is to couple to the PCU to perform a platform level operation responsive to the effective reliability stress.

In an example, the PCU is to generate statistical information regarding operation of the processor and to store the statistical information in the non-volatile storage. The statistical information may include an active time of the processor and at least one parameter histogram.

In an example, the processor further comprises a scheduling logic to dynamically perform workload balancing between the processor and at least a second processor responsive to a management controller, where the management controller is to receive the effective stress reliability via the interface.

In an example, the stress detector includes a timer to receive processor utilization information.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: receiving, in a management entity of a machine, lifetime statistical information of a processor of a system coupled to the system, the lifetime statistical information including an accumulated effective stress of the processor calculated within the processor, the management entity to manage a plurality of systems including the system; determining whether the lifetime statistical information meets at least one of a plurality of thresholds, each of the plurality of thresholds related to a different characteristic of the processor; and if the lifetime statistical information meets the at least one threshold, communicating management information to a control entity to cause the control entity to take an action with respect to the processor.

In an example, the method further comprises: communicating the management information to a node manager coupled to the system to enable the node manager to dynamically balance a workload between the processor and at least one other processor of the system responsive to the management information.

In an example, the method further comprises communicating the management information to the node manager when the lifetime statistical information exceeds a thermal-related threshold.

In an example, the method further comprises: when the lifetime statistical information exceeds a lifetime-related threshold, communicating the management information to information technology personnel to request performance of a maintenance action with respect to the processor.

In an example, the method further comprises: when the lifetime statistical information exceeds a histogram-related threshold, communicating the management information to the processor to cause a power controller of the processor to update one or more operating parameter limits of the processor.

In an example, the method further comprises: storing fault information received from the processor in a debug file associated with the processor in a debug storage of the management entity; and communicating at least a portion of the debug file to a manufacturer of the processor, where the management entity is a third party to the processor manufacturer.

In another example, a computer readable medium including instructions is to perform the method of any of the above examples.

In another example, an apparatus comprises means for performing the method of any one of the above examples.

In another example, a system comprises: a processor having at least one core and a stress detector coupled to the at least one core to determine lifetime statistical information based at least in part on a voltage and a temperature at which the processor operates, a non-volatile storage to store the lifetime statistical information, and an interface to enable a user to access at least a portion of the lifetime statistical information; and an embedded controller coupled to the processor to receive at least a portion of the lifetime statistical information and to perform a system level operation responsive thereto.

In an example, the processor is to communicate the lifetime statistical information to a management entity of the system.

In an example, the processor further comprises a power controller to control a plurality of operating parameters of the processor based at least in part on at least a portion of the lifetime statistical information and to update at least one of the plurality of operating parameters of the processor to a first degraded level when at least one parameter of the lifetime statistical information reaches a first threshold level of a plurality of threshold levels.

In an example, the interface comprises a USB controller to enable a USB device to communicate with the non-volatile storage.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
at least one core;
a power control unit (PCU) coupled to the at least one core, the PCU including a stress detector to receive at least one of a voltage and a temperature at which the processor is to operate and to calculate an effective reliability stress, and to maintain the effective reliability stress over a plurality of boot cycles;
a non-volatile storage to store the effective reliability stress; and
an interface to enable a user to access at least the effective reliability stress when the effective reliability stress reaches at least one threshold level of a plurality of threshold levels, the interface to communicate the effective reliability stress and lifetime statistical information regarding the processor in response to the effective reliability stress reaching the at least one threshold level, and in response to the lifetime statistical information exceeding a lifetime-related threshold, communicate management information to information technology personnel to request performance of a maintenance action with respect to the processor, wherein in response to the lifetime statistical information exceeding a histogram-related threshold, the PCU to update one or more operating parameters of the processor, the histogram-related threshold comprising core utilization information with regard to one or more threads.

2. The processor of claim 1, wherein the stress detector includes a reliability odometer to receive the voltage and the temperature.

3. The processor of claim 1, wherein the non-volatile storage is present in a peripheral controller hub (PCH) coupled to the processor, and the PCU is to obtain the effective reliability stress from the PCH via a first message.

4. The processor of claim 1, wherein the PCU is to control a plurality of operating parameters of the processor based on the effective reliability stress and to update at least one of the plurality of operating parameters of the processor to a first degraded level when the effective reliability stress reaches a first threshold level of the plurality of threshold levels.

5. The processor of claim 1, wherein the interface comprises a universal serial bus (USB) controller to enable a USB device to communicate with the non-volatile storage.

6. The processor of claim 1, wherein the interface comprises a network interface controller to enable the user to communicate with the non-volatile storage via a remote system.

7. The processor of claim 1, wherein an embedded controller is to couple to the PCU to perform a platform level operation responsive to the effective reliability stress.

8. The processor of claim 1, wherein the PCU is to generate statistical information regarding operation of the processor and to store the statistical information in the non-volatile storage.

9. The processor of claim 8, wherein the statistical information comprises an active time of the processor and at least one parameter histogram.

10. The processor of claim 1, wherein the processor further comprises a scheduling logic to dynamically perform workload balancing between the processor and at least a second processor responsive to a management controller, the management controller to receive the effective stress reliability via the interface.

11. A non-transitory machine-readable medium having stored thereon instructions, which if performed by a machine cause the machine to perform a method comprising:
receiving, in a management entity of the machine, lifetime statistical information of a processor of a system coupled to the machine, the lifetime statistical information including an accumulated effective stress of the processor calculated within the processor, the management entity of a datacenter to manage a plurality of systems of the datacenter including the system;
determining whether the lifetime statistical information meets at least one of a plurality of thresholds, each of the plurality of thresholds related to a different characteristic of the processor;
if the lifetime statistical information meets the at least one threshold, communicating management information to a control entity of the datacenter to cause the control entity to take an action with respect to the processor;
if the lifetime statistical information exceeds a lifetime-related threshold, communicating the management information to information technology personnel to request performance of a maintenance action with respect to the processor; and
if the lifetime statistical information exceeds a histogram-related threshold, communicating the management information to the processor to cause a power controller of the processor to update one or more operating parameter limits of the processor, the histogram-related threshold comprising core utilization information with regard to one or more threads.

12. The non-transitory machine-readable medium of claim 11, wherein the method further comprises:
communicating the management information to a node manager coupled to the system to enable the node manager of the datacenter to dynamically balance a workload between the processor and at least one other processor of the system responsive to the management information.

13. The non-transitory machine-readable medium of claim 12, wherein the method further comprises communicating the management information to the node manager when the lifetime statistical information exceeds a thermal-related threshold.

14. The non-transitory machine-readable medium of claim 11, wherein the method further comprises:
storing fault information received from the processor in a debug file associated with the processor in a debug storage of the management entity; and
communicating at least a portion of the debug file to a manufacturer of the processor, wherein the management entity is a third party to the processor manufacturer.

15. A system comprising:
a processor having at least one core and a stress detector coupled to the at least one core to determine lifetime statistical information based at least in part on a voltage and a temperature at which the processor operates, a non-volatile storage to store the lifetime statistical information regarding the processor, an interface to enable a user to access at least a portion of the lifetime statistical information when the lifetime statistical information reaches at least one threshold level of a plurality of threshold levels, and a power controller to control a plurality of operating parameters of the processor based at least in part on at least a portion of the lifetime statistical information and to update at least one of the plurality of operating parameters of the processor to a first degraded level when at least one parameter of the lifetime statistical information reaches a first threshold level of the plurality of threshold levels, the first threshold level comprising a histogram-related threshold comprising core utilization information with regard to one or more threads, wherein when the lifetime statistical information exceeds a lifetime-related threshold level, the processor is to communicate the lifetime statistical information to a management entity of the system to request performance of a maintenance action on the processor; and
an embedded controller coupled to the processor to receive at least a portion of the lifetime statistical information and to perform a system level operation responsive thereto.

16. The system of claim 15, wherein the interface comprises a universal serial bus (USB) controller to enable a USB device to communicate with the non-volatile storage.

17. The processor of claim 8, wherein the statistical information comprises at least one of error information and failure information, the interface to direct a message to a manufacturer of the processor to provide the statistical information to the processor manufacturer.

* * * * *